Aug. 29, 1967

H. A. STEVENS 3,338,009

FRUIT PACKING MACHINE

Filed Feb. 8, 1965

INVENTOR.
HOWARD A. STEVENS
BY
Herbert E. Kidder
AGENT

INVENTOR.
HOWARD A. STEVENS
BY
Herbert E. Kidder
AGENT

Aug. 29, 1967  H. A. STEVENS  3,338,009
FRUIT PACKING MACHINE
Filed Feb. 8, 1965  7 Sheets-Sheet 4

INVENTOR.
HOWARD A. STEVENS
BY
Herbert E. Kidder
AGENT

Aug. 29, 1967   H. A. STEVENS   3,338,009
FRUIT PACKING MACHINE
Filed Feb. 8, 1965   7 Sheets-Sheet 5

INVENTOR.
HOWARD A. STEVENS
BY Herbert E. Kidder
AGENT

Aug. 29, 1967  H. A. STEVENS  3,338,009
FRUIT PACKING MACHINE
Filed Feb. 8, 1965

INVENTOR.
HOWARD A. STEVENS
BY Herbert E. Kidder
AGENT

Aug. 29, 1967 H. A. STEVENS 3,338,009
FRUIT PACKING MACHINE
Filed Feb. 8, 1965 7 Sheets-Sheet 7

INVENTOR.
HOWARD A. STEVENS
BY
*Herbert E. Kidder*
AGENT

United States Patent Office 3,338,009
Patented Aug. 29, 1967

3,338,009
FRUIT PACKING MACHINE
Howard A. Stevens, Riverside, Calif., assignor to Products Engineering Co., Riverside, Calif., a copartnership
Filed Feb. 8, 1965, Ser. No. 430,899
15 Claims. (Cl. 53—245)

The present invention relates generally to a method and apparatus for packing fruit into cartons, with particular emphasis on the packing of oranges and other citrus fruit. However, while this application will refer primarily to oranges, it will be understood that the method and apparatus of the invention are adapted for use with any generally spherical fruit, such as peaches, apricots, apples, grapefruit, tomatoes, and the like, which is packed in one or more layers in cartons of fiberboard, wood, or plastic.

The primary object of the invention is to provide a new and improved method and apparatus for packing fruit into a carton, wherein the packing operation is completely automatic, and the fruit is packed into cartons at a much faster rate of speed than has ever before been possible, without any manual handling of the fruit.

Another object of the invention is to provide a machine that is extremely versatile, and capable of handling a wide variety of fruit sizes. The number of layers in a carton, and the pattern of fruit in each layer, depend upon the nature and size of the fruit, and the dimensions of the carton. Thus, some fruit may be packed in a single layer in a shallow carton, whereas other fruit, such as oranges, is packed in several layers in a relatively deep carton. The apparatus of the present invention can be adapted to pack any size of fruit in any size carton, with only a minimum of structural modification; the adaptation to a new size of fruit being accomplished by merely interchanging certain components on the machine, which are designed for quick interchange.

A further object of the invention is to provide a new apparatus for packing fruit into a carton gently and without bruising the fruit.

Another object of the invention is to provide an apparatus of the class described, which packs the fruit with an accurate count, and in precise, predetermined patterns, so that each carton is packed like every other carton for a given size of fruit.

A further object of the invention is to provide apparatus for packing fruit several layers deep in a carton, wherein each layer of fruit is placed in the carton at the level of the top thereof, and as each new layer is packed into the carton, the preceding layer is retracted down into the carton to make room for it. This continues until the carton is filled to capacity. The advantage of this feature is that it eliminates the handling problems encountered in trying to pack fruit down in the lower depths of the carton, where it is difficult to work because of the confined space.

Still another object of the invention is to provide a fruit packing machine of the class described, wherein the several functions of the machine are mechanically synchronized, so that it is virtually impossible for the machine functions to get out of synchronism.

These objects are achieved in the present invention by first loading the oranges into a grid, wherein they are arranged in a single layer and are spaced apart from one another in a loose pattern corresponding to the pattern of the layer into which they are to be packed. The oranges are then ejected from the grid, one complete layer at a time, and are guided along converging paths down into the waiting carton below. The amount of convergence is such that the oranges are brought together so that they are confined entirely within a rectangular area slightly smaller than the inside dimensions of the carton, even being compressed slightly, if necessary. As the oranges are transferred from the grid to the carton, a platen, which extends up into the carton from the open bottom end thereof, provides a horizontal receiving surface for them at the level of the carton top. Upon reaching this horizontal receiving surface, the oranges are halted momentarily in their downward travel, and then movement is resumed as both oranges and platen move downwardly in unison for a distance equal to the depth of one layer. After the first layer of oranges has been placed in the carton, it is the tops of these oranges, and of succeeding layers, that provide the horizontal receiving surface for the next layer. Thus, each layer of oranges is inserted into the carton at the level of the top layer, and the layers of oranges already packed into the carton are successively lowered, one layer at a time, until the carton is full. At that point, the bottom flaps of the carton along two sides thereof are folded closed, and the loaded carton is removed from the machine. The time cycle of the machine is based on the time interval between the movement of one empty carton from a holding station to the loading station, and the movement of the next succeeding empty carton from the holding station to the loading station.

The foregoing and other objects and advantages of the present invention will become apparent to those skilled in the art upon consideration of the following detailed description of the preferred embodiment thereof, reference being had to the accompanying drawings, wherein.

The structural arrangement of the machine of the present invention is best shown in FIGURES 1-6, to which attention is first directed. The machine has been illustrated more-or-less schematically for the purpose of clarity, and those skilled in the art will readily appreciate that the mechanism may take various forms other than those shown.

The supporting framework has been almost entirely omitted, except for fragmentary portions, such as certain tracks 10 and 11, and a platform 12 along which the cartons slide. The main components of the machine consist of a grid 13, feed tubes 14, stripper 15, compression collar 16, platen 20, carton advancing mechanism 21, carton folding mechanism 22, and the driving and control mechanism 23.

The grid 13 is essentially an elongated, flat, rectangular member having a plurality of holes 24 provided therein, which serve as pockets to hold the oranges. In the embodiment illustrated in the drawings, the grid 13 is made with pockets 24 to hold oranges enough to completely fill one of the cartons 25, four layers deep, in one pass over the carton. The grid 13 is supported on four rollers 26 (or other sliding supports), which travel on the two laterally spaced tracks 10. Mounted on one side edge of the grid 13 is a longitudinally extending rack 30, which is engaged by a drive pinion 31, and the latter is driven by means to be described hereinafter, whereby the grid is advanced in four successive steps, and then is returned in one single motion, to complete the cycle of the machine.

Figures 2, 3, 4:
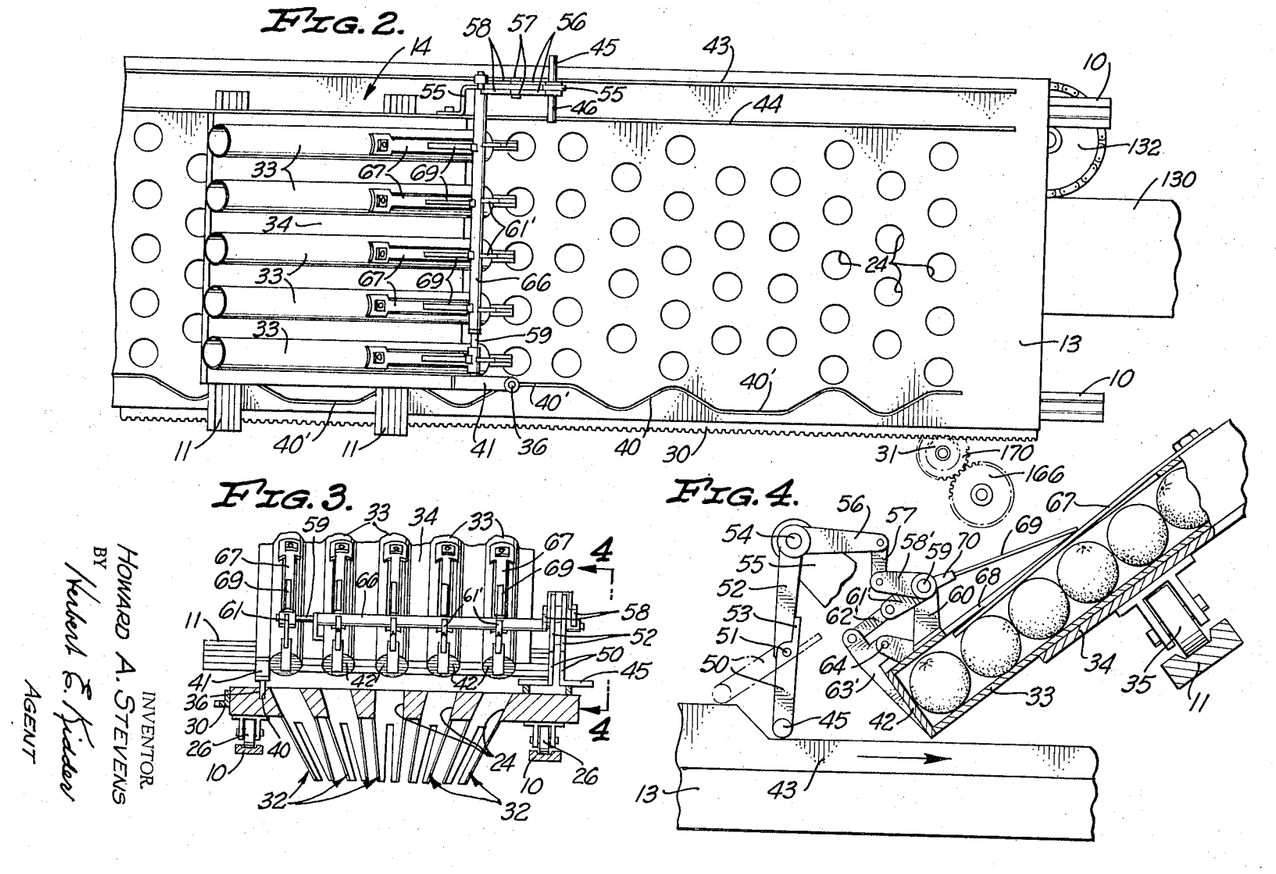
FIGURE 2 is another view of the same, looking down on the machine along the line 2—2 in FIGURE 1.
FIGURE 3 is a fragmentary sectional view taken at 3—3 in FIGURE 1.
FIGURE 4 is a partially cut-away, fragmentary elevational view, taken at 4—4 in FIGURE 3.
Figure 5:
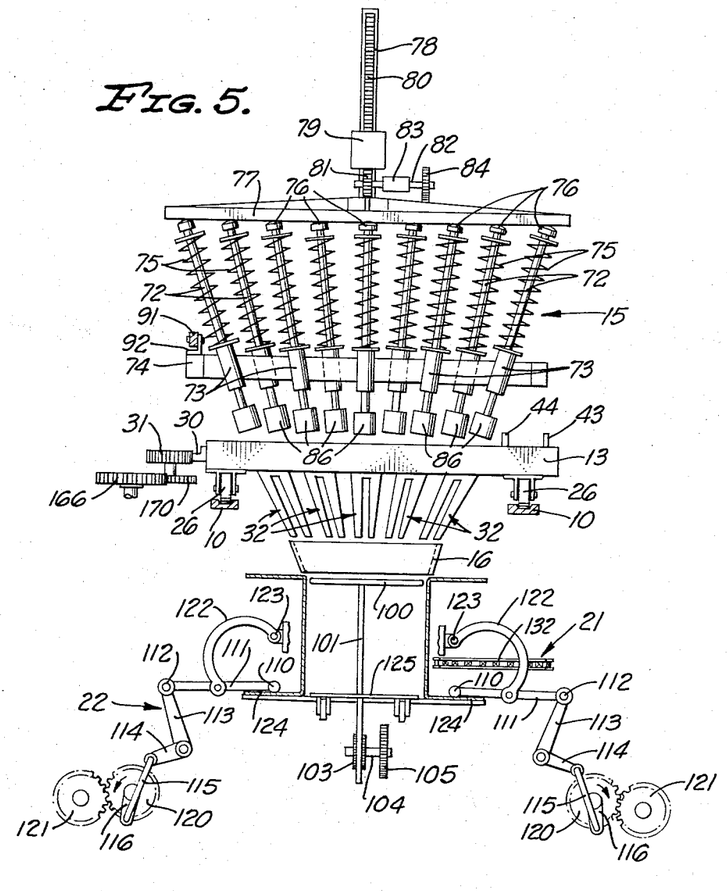
FIGURE 5 is a transverse sectional view of the machine, taken at 5—5 in FIGURE 1.

The pockets 24 are arranged in four groups of four transverse rows each; there being four rows of oranges to each layer in the carton in this particular instance. As shown in FIGURE 2, the first group of four rows of pockets 24, constituting the bottom layer in the carton, starts with a five-pocket row, and is followed by staggered four-, five-, and four-pocket rows, respectively. The second group of four rows of pockets, constituting the second layer in the carton, starts with a four-pocket row, that is not staggered with respect to the preceding row, and this is followed by staggered five-, four-, and five-pocket rows, respectively. The third group of four rows, only one of which can be seen in FIGURE 2, starts with a five-pocket row that is not staggered with respect to the preceding row, and is followed by staggered four-, five-, and four-pocket rows. The last group of four rows, constituting the top layer in the carton, starts with a four-pocket row (not shown) that is not staggered with respect to the preceding row, and is followed by staggered five-, four-, and five-pocket rows, only the last two of which can be seen in FIGURE 2.

The pattern of pockets 24 in the grid 13 will vary according to the size and nature of the fruit, which governs the number of layers in the carton, the number of rows in a layer, and the number of fruit in a row. Also, some fruit, such as apples, are stacked one directly over the other, whereas oranges and other fruit are packed in a staggered pattern so that each orange in one row lies midway between two oranges in the next adjoining rows, both horizontally and vertically. The grid pattern shown in FIG. 2 illustrates a typical pattern for oranges. A smaller size orange might require five or six layers to the carton, with six or seven rows to the layer, and six or seven oranges per row. In the case of apples, the rows of pockets 24 would not be staggered, but would be arranged in straight lines, and each row would have the same number of pockets.

The pockets 24, in each group of four rows, converge downwardly, and attached to the underside of the grid 13, concentric with the pockets, are downwardly converging guide tubes 32. Each of the guide tubes 32 is made up of several spring fingers, which converge somewhat at their lower ends. The guide tubes 32 are smaller at their lower ends than the diameter of the oranges, and the latter are thus prevented from dropping through. However, a little downward pressure exerted on the orange causes it to push through the guide tube, spreading the spring fingers apart as it goes. Figure 3 shows that the pockets 24 and guide tubes 32 converge in the transverse plane, as well as in the longitudinal plane. It is also contemplated that the pockets 24 and guide tubes 32 might be made parallel to one another in the transverse plane, and the strippers 15 likewise parallel in the transverse plane; in which case the pockets 24 would be spaced closer together in the transverse direction, than as shown in FIG. 2.

The pockets 24 in the grid 13 are filled with oranges by a row of laterally spaced, inclined feed tubes 33, which are mounted on a frame 34. The frame 34 is mounted on rollers 35 that run on the tracks 11, and the entire assembly of feed tubes is movable laterally as a unit. The feed tubes 33 are spaced apart from one another the same distance as the space between pockets 24 in any one of the rows on the grid, and the bottom ends of the feed tubes are adapted to be aligned with the pockets. The feed tubes 33 are shifted laterally along the tracks 11 to successively align them with the pockets in first one row and then in the next, by means of a downwardly projecting pin, or roller, 36, which slides along a zig-zag cam slot 40 formed in the top surface of the grid 13. The pin 36 is held by one end of an arm 41 which is attached at the other end to the frame 34. Thus, as the grid advances along the tracks, the feed tube assembly 14 is shifted back and forth, to align the lower ends of the tubes first with one row of the pockets 24 and then with the next.

It will be noted in FIGURE 2 that the cam slot 40 goes from side to side along its zig-zag course only between staggered rows of pockets; and between non-staggered rows (i.e., fourth and fifth, eighth and ninth, twelfth and thirteenth) the slot 40 extends parallel to the line of travel of the grid 13, as shown at 40'. The reason for this is that the pockets in the fifth, ninth, and thirteenth rows are directly in line with the corresponding pockets of the fourth, eighth, and twelfth rows, respectively, and the feed tubes 33 must therefore be left in the same position to load both rows of pockets in a pair of non-staggered rows.

Each of the tubes 33 is filled by a conveyor (not shown) and holds the number of oranges required to fill all of the pockets 24 in the grid for the line served by that tube. The oranges are dropped one at a time into the pockets 24 by means of a release mechanism consisting of a gate 42 which is supported for swinging movement. The gate 42 normally closes the bottom end of the feed tube 33, and prevents the oranges from running out.

As the grid 13 is returned from its terminal position at the extreme right-hand end of its travel (as viewed in FIG. 1), to the starting position at the left-hand end of its travel, the pockets 24 are filled with oranges, which are dropped from the feed tubes 33. This is accomplished by means of two laterally spaced, linear cams 43 and 44, which extend along the left-hand edge of the grid, and which function to open the gates 42 at the proper times. Riding on the cams 43, 44 are cam followers 45 and 46, respectively, each of which projects laterally from the bottom end of a lever arm 50. Each of the cam followers 45, 46 is of such length that it remains on its respective cam 43, 44 for the full range of transverse movement of the feed tube assembly 14, responsive to the action of pin 36 traveling in cam slot 40. The linkage connecting the cam followers 45 and 46 to their respective gates 42 are identical in many respects, and the following description of the linkage for cam follower 45 applies to both, except where stated to the contrary.

The lever arm 50 is hinged at 51 to the bottom end of an upper lever arm 52, and together, they form a jointed arm, the lower end 50 of which is free to swing in the clockwise direction up to the phantom-line position shown in FIG. 4. A limit stop 53 prevents the arm 50 from swinging in the opposite direction from the solid-line position shown in the drawing. By virtue of this arrangement, the jointed arms 50, 52 allow the cam followers 45, 46 to ride up over the raised lobes of the cams 43, 44 when the grid 13 travels from right to left, as viewed in FIG. 4, and when the grid travels in the opposite direction (i.e., from left to right), the cam followers 45, 46 are pushed ahead of the raised lobes, causing the jointed arm 50, 52 to swing in the counterclockwise direction about a pivot shaft 54, which is supported on a bracket 55.

The jointed arm 50, 52 of cam follower 45 forms one arm of a bell-crank, the other arm 56 of which projects horizontally toward the feed tube and is connected by a link 57 to a lever arm 58 mounted on one end of a shaft 59. The shaft 59 is rotatably supported by brackets 60, and extends horizontally across the foot of the feed tube assembly 14 to the tube 33 at the far side thereof. Mounted on the far end of the shaft 59 is a lever arm 61 which is connected by a link 62 to the top end of an arm 63 that is attached to the outer face of the gate 42. The arm 63 has a laterally projecting ear which is pivoted at 64 on a bracket 65 mounted on the top of the tube 33.

The cam 43 and follower 44 thus act through the linkage described above, to open the gate 42 of the one feed tube 33 at the bottom end of the assembly 14, as viewed in FIG. 2. The gates 42 of the other four feed tubes 33 are opened by cam 44 and follower 46, to which they are connected by linkage that will now be described.

Cam follower 46 is likewise connected to a jointed arm 50, 52 on a bell-crank having another arm 56, to which a link 57 is connected. The link 57 is connected to an arm corresponding to 58, which is fixed to one end of a tubular shaft 66 that surrounds shaft 59, but extends only as far as the next-to-last feed tube 33 at the far end of the assembly 14. Mounted on the tubular shaft 66 directly above each of the top four tubes (FIG. 2) of the assembly 14, is an arm 61' similar to arm 61, which is connected by link 62' to arm 63'. Thus the gates 42 of the upper four feed tubes 33 (as viewed in FIG. 2) are opened in unison by cam 44 and follower 46, and each of the gates 42 has its own locking toggle links 61, 62, which prevent the gates 42 from being opened by the weight of the oranges in the tube 33.

The locking action of the toggle links 61, 62 is clearly evident in FIG. 4. The weight of oranges pressing against the gate 42 causes the top end of the arm 63 to push toward the right, along the longitudinal axis of the link 62 and arm 61. The pivot connection between the adjoining ends of the link 62 and arm 61 lies on a straight line extending through the pivot centers at the outer end of members 61, 62, and this forms a dead-center lock. When the jointed arm 50, 52 is swung in the counter clockwise direction (FIG. 4) by its respective cam 43, 44, link 57 raises the arm 58, or 58', and this breaks the toggle upwardly to release the lock. The gate 42 is then swung outwardly to open the bottom end of the feed tube 33 and allow one orange to drop into the waiting pocket below.

The other oranges backed up in each of the feed tubes 33 are prevented from running out of the open tube by means of a retaining leaf spring 67, which is secured at one end to the top side of the feed tube and extends downwardly toward the lower end of the tube in an open slot 68 formed in the top side of the tube. The lower end of the spring 67 bears lightly against the top of the second-from-the-bottom orange, and when the gate 42 is closed, as in FIG. 4, the oranges in the tube roll freely down to the bottom of the tube, with the very bottom orange clear of the lower end of the spring 67.

When the gate 42 is opened to release the bottom orange, however, the spring 67 is pressed down against the second-from-the-bottom orange with increased pressure, thereby preventing the latter from escaping. This increased pressure of the spring 67 is caused by another leaf spring 69, which bears at one end against the top side of spring 67, and is secured at its other end in a holder 70 formed integrally with each of the arms 61, but extending in the opposite direction from the latter. Thus, when any one of the arms 61 swings upwardly to break its toggle linkage, the leaf spring 69 is swung downwardly, and the free end of the spring 69 is caused to bear downwardly against spring 67 with increased force.

Thus from the foregoing description, it will be seen that the pockets 24 of the grid 13 are filled with oranges during the return travel of the grid from its terminal position at the right-hand end of its travel (as viewed in FIGURE 1), to its starting position at the left-hand end of its travel. During this return travel of the grid, the feed tube assembly 14 is shifted first to one side and then the other by the cam slot 40 and pin 36, to align the feed tubes 33 with the staggered pockets 24 in the grid. As each line of pockets passes below the feed tubes 33, the gates 42 are opened, allowing one orange to drop from the tube into the waiting pocket. The cams 43, 44 open the gates 42 at the proper times and, in the case of the feed tube next to the cam slot 40, the gate 42 is not opened by its cam 43 when the feed tube assembly has been shifted over to fill the four-pocket rows.

As the now-loaded grid 13 moves forwardly from its starting position, it travels to the right (FIG. 1) along track 10, until the first group of pockets 24 is positioned directly over the carton 25, at the loading station 71 on platform 12. At this point, the grid 13 pauses momentarily, and the strippers 15 eject the oranges from the pockets 24 and transfer them down into the carton.

The strippers 15 preferably comprise a plurality of plungers 72, each of which is slidably supported by a bearing 73 mounted on a frame 74. The plungers 72 are positioned above the grid 13 in a downwardly converging relationship, and they are so spaced and oriented that they are aligned with their respective pockets 24. Each of the plungers 72 is pushed upwardly by a spring 75, and mounted on the top ends of the plungers are rounded heads 76, which bear against the underside of a horizontal plate 77. The plate 77 is attached to the bottom end of a shaft 78, and the latter is supported for vertical sliding movement by a bearing 79. Rack teeth 80 are formed in one side of the shaft 78, and these are engaged by the teeth of a pinion 81, mounted on a shaft 82. Shaft 82 is journaled in a bearing 83, and mounted on the other end of the shaft is a gear 84, which meshes with a driving gear 85. Gear 85 is connected to the driving mechanism of the machine in a manner that will be described later.

Thus, when the pinion 81 is caused to rotate, the shaft 78 is driven downwardly, pushing all of the plungers 72 under the plate 77 downwardly through their respective pockets 24, thereby ejecting the oranges from the pockets. The bottom ends of the plungers 72 are provided with enlarged heads 86, which provide a broad contact surface to contact the oranges without injuring them.

The plungers 72 are staggered on the frame 74 in much the same manner as the pockets 24 of the grid 13. In the embodiment illustrated, there are five rows of plungers 74. If each group of pockets 24 in the grid consisted of five rows, there would be six rows of plungers in the stripper; and if each group of pockets consisted of six rows, there would be seven rows of plungers in the stripper. The only exception to this is when stacking fruit such as apples, that are stacked one on top of the other, in which case the rows of pockets in the grid would not be staggered. The strippers 15 would then have the same number of plungers 72 as there are rows of pockets in the grid 13, and the same plungers would strip the same pockets for each layer.

Returning to the embodiment illustrated herein, I show a stripper 15 having five rows of plungers 72, the first row of which has five plungers, which are aligned with a corresponding first row of five pockets in the grid. The second and fourth rows have four plungers each, while the third and fifth rows have five plungers each. Only four rows of plungers 72 are used at one time to eject oranges from the four rows of pockets 24 in each group. However, the first and third groups consist of four rows having 5, 4, 5 and 4 pockets each, respectively; while the second and fourth groups consist of four rows having 4, 5, 4 and 5 pockets each, respectively. In addition to having different numbers of pockets, the four-pocket rows are staggered laterally with respect to the five-pocket rows. Thus, it becomes obvious that a 5-4-5-4 group of pockets must be stripped by a 5-4-5-4 group of plungers 72; and a 4-5-4-5 group of pockets must be stripped by a 4-5-4-5 group of plungers.

Figure 1:
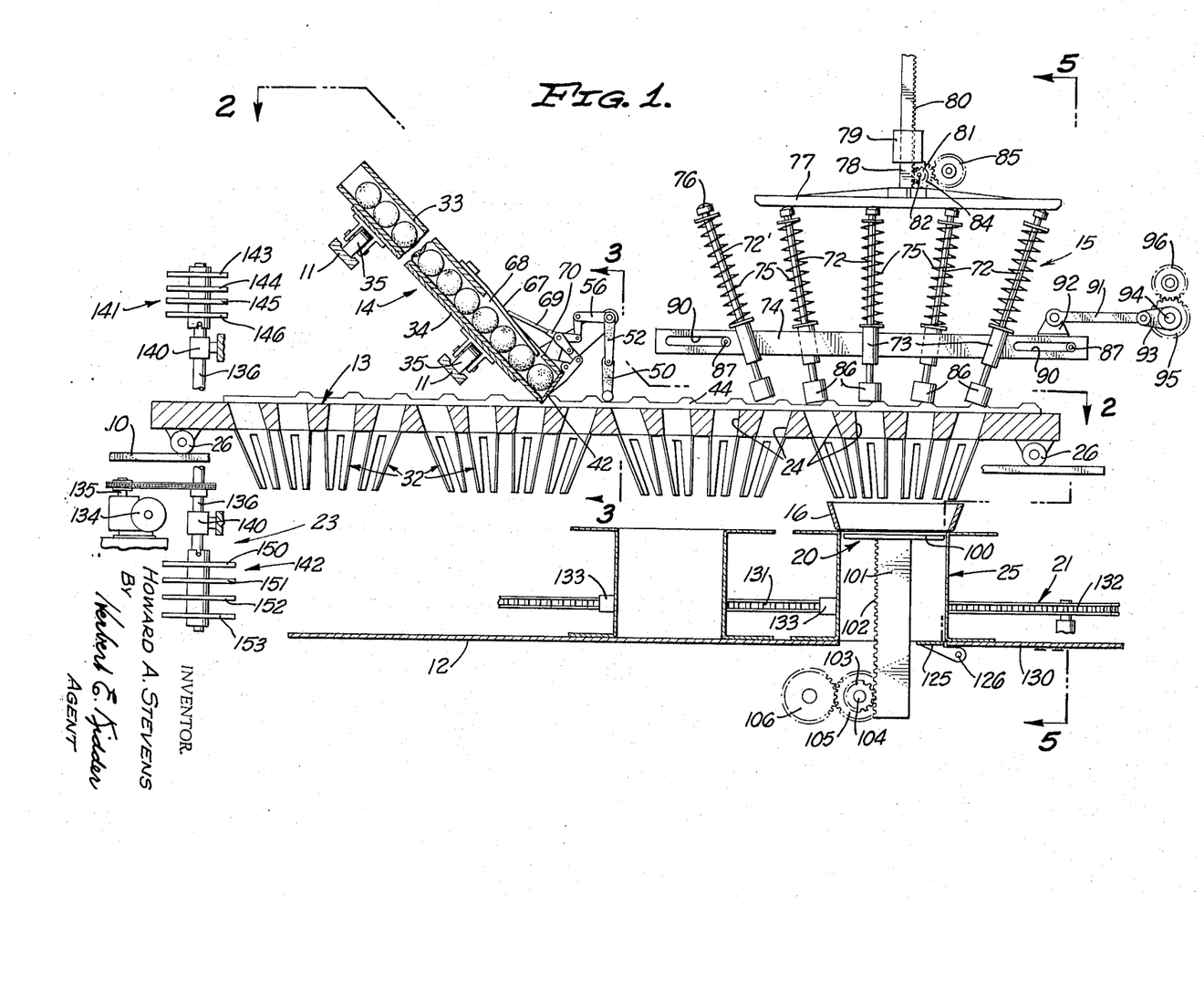
FIGURE 1 is a more-or-less schematic representation of a machine embodying the principles of the invention, showing the operating mechanism thereof as seen in a longitudinal, vertical section.

To accomplish this, the stripper assembly 15 is shifted alternately between two operating positions wherein the four rows of plungers at first one end of the assembly 15, and then at the other, are brought into operating position under the plate 77. It will be noted in FIG. 1 that the horizontal plate 77 covers only four of the rounded heads 76, and the extreme left-hand row of plungers 72 is clear of the left-hand end of the plate. When the plate 77 comes down, only the four plungers 72 directly under the plate are pushed downwardly by it. In FIG. 1, the four rows of plungers pressed downwardly by the plate 77 are a 5-4-5-4 group, which are required to strip the first group of pockets 24, which is a 5-4-5-4 group.

When the second group of pockets 24 comes into position above the carton 25, it is a 4-5-4-5 group. To strip this group of pockets, the stripper 15 is shifted one row to the right (as viewed in FIG. 1), which carries the first row of plungers beyond the right-hand edge of the plate 77, and simultaneously brings the last row of plungers under the left-hand edge of the plate. The four rows of plungers now under the plate 77 are a 4-5-4-5 group, which are approximately aligned with their respective pockets 24 in the 4-5-4-5 group in the grid 13. There is some slight misalignment of the plungers with respect to the pockets 24 and tubes 32, but this is of no consequence, as there is considerable clearance between the plungers 86 and the sides of the pockets 24.

The shifting of the stripper assembly 15 between the two operating positions described above, is accomplished by mounting the frame 74 for horizontal sliding movement on pins 87, which are slidably received within horizontal slots 90. A link 91 is connected at one end to a bracket 92 on the frame 74, and the other end of the link is connected to a crank arm 93 which is journaled on a shaft 94. The arm 93 is connected to a gear 95, and the latter meshes, in turn, with a driving gear 96. Gear 96 is connected to the driving mechanism of the machine in a manner whereby the crank arm 93 is turned through one half-revolution each time the grid 13 is advanced one step, thereby shifting the stripper assembly 15 alternately between the left-hand position shown in FIG. 1, and a right-hand position (not shown).

As each of the groups of oranges is ejected downwardly by the stripper 15, the oranges are guided along converging paths by the guide tubes 32, and enter the downwardly converging compression collar 16, which guides the layer of oranges into the top end of the carton. The plungers 72 push the oranges ahead of them at a rate of speed somewhat faster than the falling speed of the oranges, so that the oranges are positively guided by the plungers while passing downwardly through the compression collar 16, and are held against the bottom ends of the pusher heads 86. This prevents the oranges from falling away from the pusher heads 86, and insures that the layer of oranges will not become jumbled in the process of being transferred from the ends of the guide tubes 32 into the carton.

Figure 7:
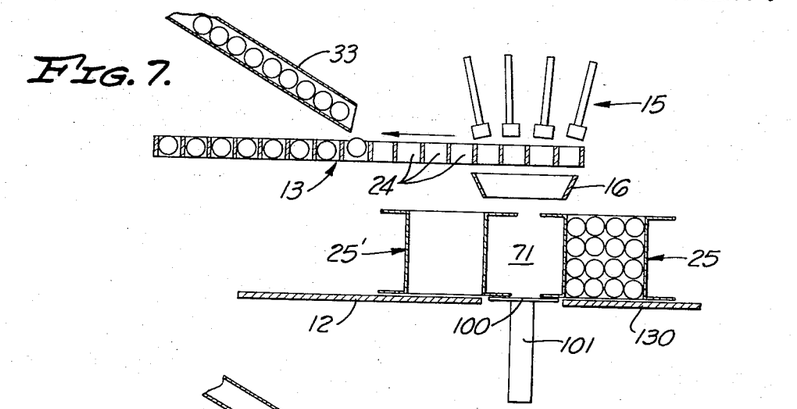
FIGURE 7 is a further simplified schematic drawing, showing the functions of the machine that are performed durring rotation of the control cams from 0 degree to 90 degrees during which time the grid is being filled, a full carton is being moved from the loading station to a delivery table, and an empty carton is being moved into the loading station.
Figure 8:
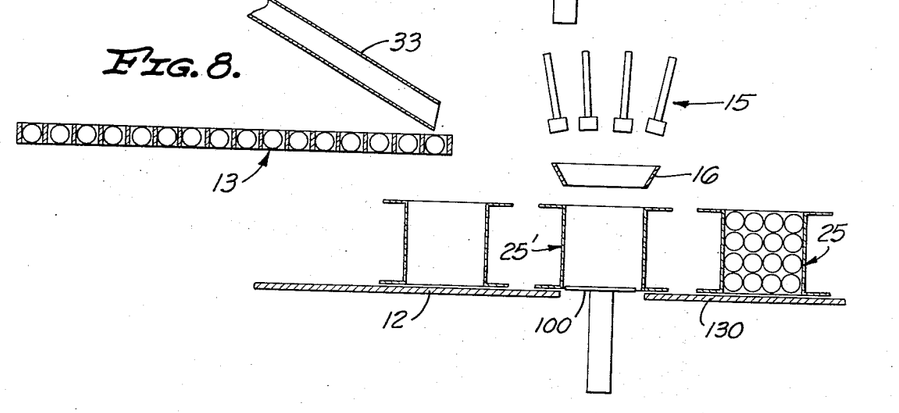
FIGURE 8 is a similar view, showing the condition of the machine when the control cam has turned through 162 degrees, showing the grid completely filled and an empty carton in place at the loading station.

The compression collar 16 is movable vertically between the position shown in FIG. 1, and a slightly elevated position, only a fraction of an inch higher, shown greatly exaggerated in FIGS. 7 and 8, to which elevated position the compression collar is raised while the loaded carton is being removed from the loading station and an empty carton is being moved into its place. At the completion of this carton exchange, the compression collar 16 is brought down to the position shown in FIG. 1, where it helps to guide the oranges down into the open top end of the carton.

Projecting up into the carton through the open bottom end thereof is a platen 100, which is a thin, flat plate, carried at the top end of a slender, blade-like support 101. Rack teeth 102 are formed in one side of the support 101, and these are engaged by a pinion 103 on a shaft 104. A gear 105 is mounted on the shaft 104, which meshes with another drive gear 106. Drive gear 106 is driven by the control mechanism of the machine, as will be described later.

The function of the platen 100 is to provide a receiving surface for the oranges as they leave the bottom ends of the tubes 32, and while they are confined within the compression collar 16. The receiving surface of the platen 100 is provided by the top surface of the plate 100 when the plate is at the top edge of the carton, as in FIG. 1. As the oranges are pushed downwardly by the stripper plungers 72, they come to rest on the plate 100, and their downward travel is momentarily halted; then the oranges and the plate 100 move downwardly in synchronism, until the oranges occupy the level of the top layer in the box. At this point, the stripper plungers 72 are retracted by the spring 75, and the grid 13 is advanced to the next step, to bring the next group of pockets 24 into position above the carton. As the next layer of oranges is pushed down into the carton, they come to rest on the tops of the first layer of oranges, and after a momentary pause, the oranges and the platen 20 move downwardly in synchronism, until the second layer occupies the top layer level of the carton. Thus, the horizontal receiving surface for the second, and succeeding layers of oranges, is provided by the tops of the oranges in the layer below, although it is the platen 100 that locates this receiving surface at the plane of the top edge of the carton; and also, it is the platen that causes the receiving surface to move downwardly with each new layer of oranges.

The remaining layers of oranges are successively inserted into the carton until the latter is completely filled, at which point the plate 100 is at the very bottom of the carton 25. The two bottom flaps on opposite sides of the carton 25 are then folded inwardly, and the loaded carton is removed from the loading station.

The folding of the bottom flaps of the carton is accomplished by a pair of folding bars 110 on opposite sides of the carton 25 (see FIG. 5), which swing downwardly and inwardly, along arcuate paths, to fold the flaps of the carton up against the underside of the plate 100. Each of the folding bars 110 is disposed parallel to the line of travel of the cartons 25 along the platform 12, and is attached at its midpoint to one end of an arm 111, whereby the bar 110 and arm 111 resemble the letter T. The other end of the arm 111 is connected at 112 to one arm 113 of a bell crank, the other arm 114 of which is connected by a link 115 to a crank 116. Crank 116 is driven by a gear 120, and meshing with gear 120 is a driving gear 121. Driving gear 121 is connected to the actuating mechanism of the machine, as will be described later. The folding bar arm 111 is supported intermediate its ends by one end of an arcuate link 122, the other end of which is swingably connected at 123 to the frame of the machine.

When the two cranks 116 are driven in the direction of the arrows (see FIG. 5) through one complete revolution, the bell cranks 113, 114 are oscillated first in one direction and then in the other, causing the folding bars 110 to be swung downwardly and inwardly toward the center line of the carton, to press the bottom flaps 124 against the underside of the plate 100. Prior to folding the flaps 124 inwardly, a holding flange 125, at the leading edge of the carton, is swung downwardly out of the way about its pivots 126, to permit the carton flaps 124 to bear against the underside of the plate 100. Upon completion of the flap-folding operation, the holding flange 125 is swung back up to its original position, where it provides support from below for the flaps 124 after the folding bars 110 have been retracted to their original positions. During the loading operation, the carton is supported along its leading edge by the holding flange 125, which projects horizontally under the carton at the right-hand side thereof, as viewed in FIG. 1.

The loaded carton is then slid off the plate 100 and onto a platform 130 beyond the loading station 71, where all of the remaining flaps of the carton are closed and sealed. The transfer of the loaded carton from the loading station 71 to platform 130 is accomplished by the carton-advancing mechanism 21, which may conveniently take the form of a chain 131 driven by sprockets 132, only one of which can be seen in FIG. 1. A carton-engaging pawl 133 on the chain 131 engages the carton 25 on the back side thereof and pushes the carton along the platform 12 to the platform 130. The carton-advancing mechanism 21 is driven by the actuating mechanism of the machine, as will be described later.

Figure 6:
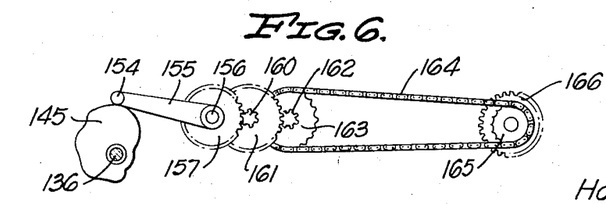
FIGURE 6 is a more-or-less schematic representation of one of the control cams for timing and driving one of the functions of the machine, showing the step-up gearing and associated power transmission means.

The actuating and control mechanism of the machine is shown somewhat schematically in FIGURES 1 and 6. Power for driving the machine is derived from an electric motor 134 having integral speed-reduction gears, whereby the output drive shaft 135 turns at a very slow speed, to drive a vertical cam shaft 136 through one complete revolution for each complete cycle of the machine. Cam shaft 136 is journaled in bearings 140, and mounted on opposite ends of the shaft are two cam assemblies 141 and 142. The upper cam assembly 141 consists of four cam disks 143, 144, 145 and 146, while the lower cam assembly 142 consists of four cam disks 150, 151, 152 and 153. Cam 143 drives the stripper plate 77; cam 144 drives the horizontal shifting mechanism for the stripper assembly 15; cam 145 drives the mechanism for advancing and retracting the grid 13; and cam 146 drives the platen 20. In the lower cam assembly 142, cam 150 drives the carton-advancing mechanism 21; cam 151 drives the folding mechanism; cam 152 drives the holding flange 125; and cam 153 raises and lowers the compression collar 16.

Each of the cams 143, 144, 145, 146, 150, 151, 152 and 153 has a cam follower 154 (see FIG. 6), which rides on the periphery of the cam. The cam follower 154 is mounted on the end of an arm 155, which is supported for swinging movement about a pivot 156. Attached to the arm 155 is a gear 157 of relatively large diameter, which drives a small-diameter pinion 160, and the latter is attached, in turn, to a large-diameter gear 161. Gear 161 drives a small-diameter pinion 162, and the latter is connected to a sprocket 163, which drives a chain 164. Chain 164 is trained around a driven sprocket 165, and the latter is connected to a gear 166. As shown in FIGURE 2, gear 166 drives a gear 170, which is connected to pinion 31, and the latter meshes with rack 30 to drive the grid 13. Gears 157, 160, 161 and 162 serve as step-up gears, to multiply the angular movement of the cam follower arm 155. Thus, a few degrees of angular movement of arm 155 causes the drive pinion 31 to turn through many revolutions, and in this way, the grid 13 can be driven for considerable distances by the relatively limited angular movement of the arm 155, as the follower 154 rides on the cam.

The other mechanisms (stripper drive, folding mechanism, platen drive, carton-advancing mechanism, etc.) are driven by similar cam followers with step-up gears and associated transmission means. In some cases, such mechanism will necessarily include a one-way clutch, which is required when the drive must always go in one direction, and is not reversed. Such devices are well-known in the art, and it is not deemed necessary to illustrate and describe the same in detail.

The upper cam assembly 141 may be made interchangeable with other cam assemblies, where it is desired to change the machine over to a different number of layers of different patterns, as when packing fruit of varying sizes. For this purpose, the upper cam assembly is made so that it can be mounted on shaft 136 in one position only, thereby avoiding the possibility of getting the machine out of time. At the same time that the upper cam assembly 141 is exchanged, the grid 13, feed tube assembly 14, and stripper 15 would be interchanged with other like units, to give the desired combination of layers and patterns for each layer.

The operating sequence of the machine is shown schematically in FIGS. 7–25, inclusive, to which attention is now directed.

FIGURE 7 shows the first step in the loading operation, which occurs while the cam shaft 136 is turning from 0 to 90 degrees. A full carton 25 is being removed from the loading station 71, and an empty carton 25' is being moved into its place. The compression collar 16 is raised to clear the cartons, but not high enough to interfere with the bottom ends of the guide tubes 32. At the same time, the grid 13 is being moved from right to left, and the pockets 24 are being filled with oranges by the feed tubes 33.

FIGURE 8 shows the machine when the control cam shaft 136 has turned through 162 degrees. The grid 13 is now completely filled; the full carton 25 has been removed to the platform 130; the empty carton 25' is now in place at the loading station; and the grid 13 is about to start forwardly.

Figure 9:
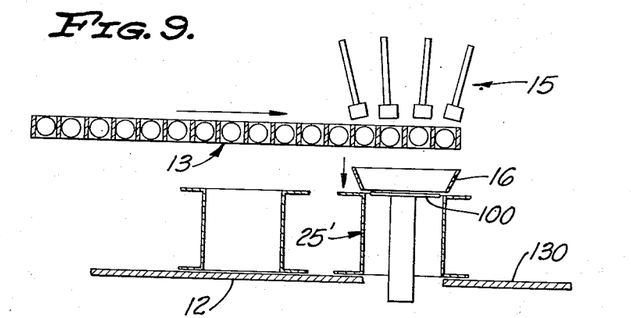
FIGURE 9 shows the machine when the control cam has turned through 168 degrees, at which point the platen is positioned at the top of the empty carton, the compression collar is down against the top of the carton, and the grid has advanced to the first layer position.

In FIGURE 9, the cam shaft has advanced to 168 degrees; the grid 13 has advanced to position the first group of pockets directly over the carton 25'; the compression collar 16 has been lowered to engage the edge of the carton; and the platen 100 has been raised to the top edge of the carton.

Figure 10:
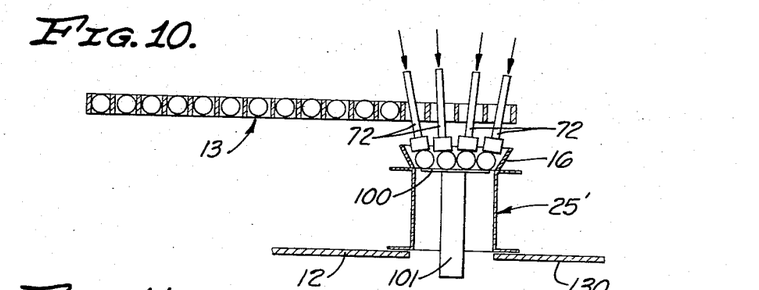
FIGURE 10 shows the machine when the control cam has reached the 180 degree point, showing how the oranges are pushed out of the grid by the strippers and down into the compression collar, where they stand on the top surface of the platen.

FIGURE 10 shows the machine when the cam shaft has advanced to 180 degrees. The stripper plungers 72 have ejected the oranges from the pockets 24 in the grid 13, and the oranges have come to rest on the platen 100. At this point, the plungers 72 and the oranges have come to a momentary stop.

Figure 11:
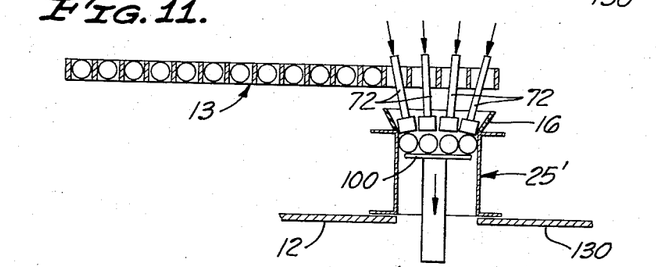
FIGURE 11 shows the machine when the control cam has turned through 198 degrees, with the strippers and platen moving downwardly together through a distance of one layer.

FIGURE 11 shows the cam shaft advanced to 198 degrees. At this point, the plungers 72 and the oranges, together with the platen 100, have moved downwardly in unison, and the oranges now occupy the top layer level of the carton.

Figure 12:
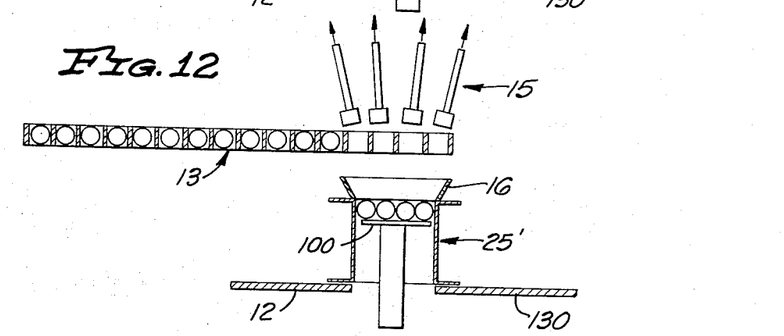
FIGURE 12 shows the control cam turned to the 210 degree position, at which point the strippers have been retracted clear of the grid.

In FIGURE 12, the cam shaft 136 has advanced to 210 degrees, and the stripper plungers 72 have been retracted to their initial position.

Figure 13:
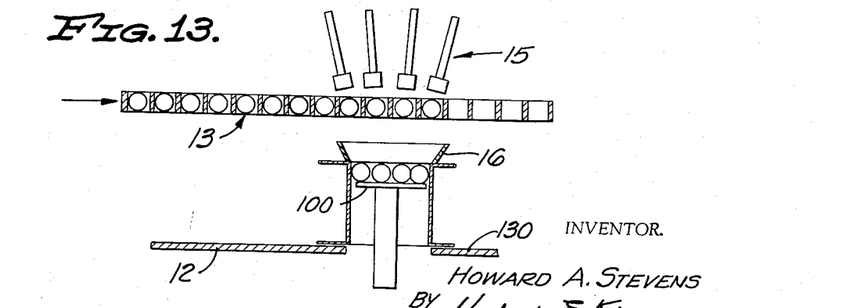
FIGURE 13 shows the machine when the control cam has turned through 316 degrees, at which point the grid has advanced to the second layer position.

In FIGURE 13, the cam shaft has advanced to 216 degrees, and the grid 13 has been advanced the next step, to position the second group of pockets 24 directly above the carton 25'.

Figure 14:
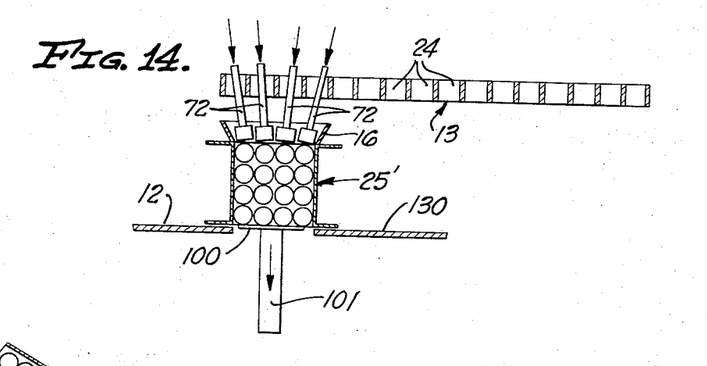
FIGURE 14 shows the machine when the control cam has turned through 348 degrees, at which point the final layer of oranges has been packed into the carton.

FIGURE 14 shows the machine when the cam shaft has advanced to 318 degrees. The stripper plungers 72 have just completed the loading of the last layer of oranges into the carton, and the platen 100 is now down at the bottom of the carton.

Figure 15:
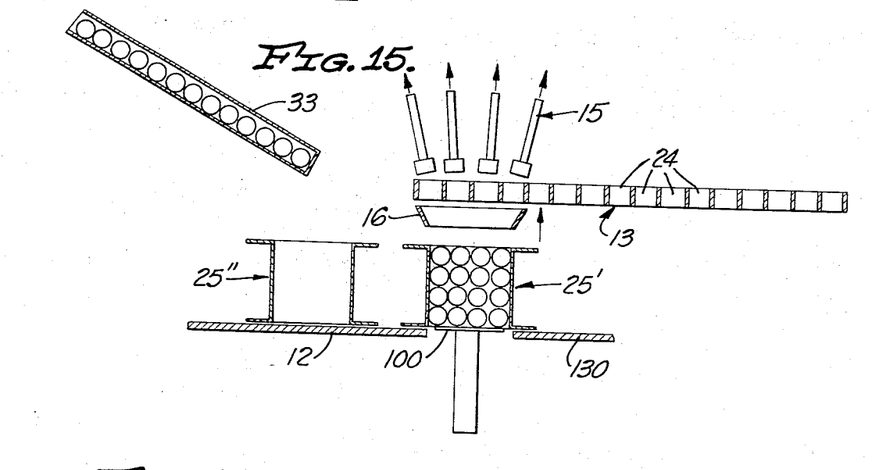
FIGURE 15 shows the machine when the control cam has turned through 354 degrees, at which point the strippers have been retracted clear of the empty grid, and the compression collar has been raised from the carton in readiness to begin the next cycle, the start of which is shown in FIGURE 7.

In FIGURE 15, the cam shaft has advanced to 354 degrees; the stripper 15 has been retracted; the compression collar 16 has been raised to clear the cartons; the empty grid 13 is about to start its return trip, during which the pockets 24 will be refilled with oranges from the tubes 33, which have now been reloaded; the fully loaded carton 25' is about to be removed from the loading station onto platform 130; and another empty carton 25'' is about to be moved into its place in the loading station.

Figure 16:
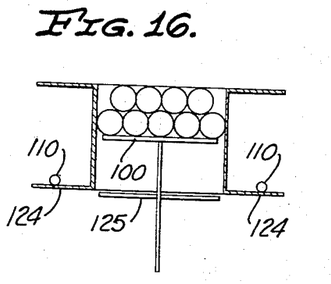
FIGURES 16 and 17 are end and side views, respectively, of the carton and platen, showing the fold bars and the holding flange in the positions that they maintain during rotation of the control cam from 0 degree to 282 degrees.
Figure 17:
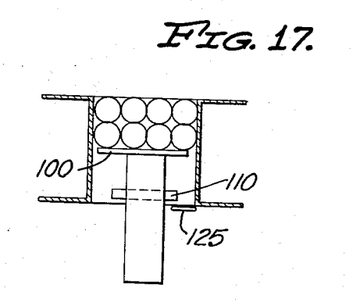

FIGURES 16 to 25, inclusive, show the sequence of operations involved in the folding of the bottom flaps of the carton, as the latter is completely filled. FIGURES 16 and 17 show the positions of the folding bars 110 and holding flange 125 during the first 282 degrees of rotation of the cam shaft 136.

Figure 18:
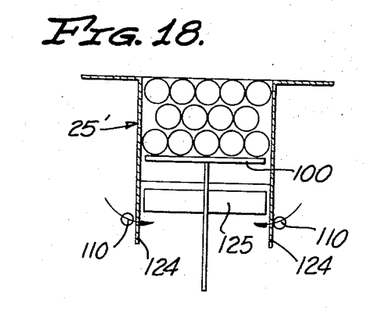
FIGURES 18 and 19 are similar views, showing the holding flange hanging downwardly, and the folding bars at about the midpoint of their travel as they swing downwardly and inwardly toward the centerline of the carton, pushing the end flaps of the carton ahead of them.
Figure 19:
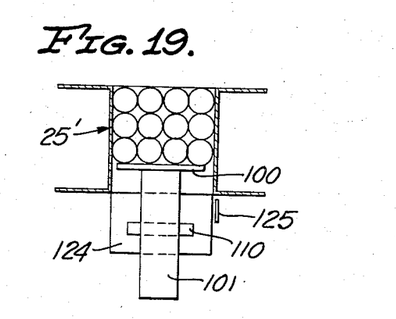

In FIGURES 18 and 19, the cam shaft has advanced to the 294 degree position. The holding flange 125 has been swung down out of the way, and the folding bars 110 have started to fold the bottom flaps 124 of the carton inwardly.

Figure 20:
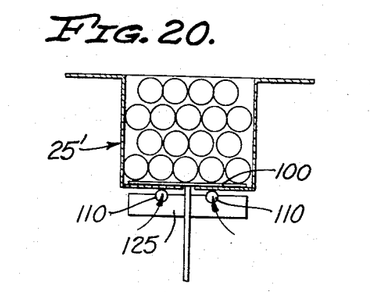
FIGURES 20 and 21 are similar views, showing the folding mechanism as it appears when the control cam is at the 306 degree position, at which point the folding bars are at the end of their travel, and the end flaps of the carton are pressed firmly against the underside of the platen.
Figure 21:
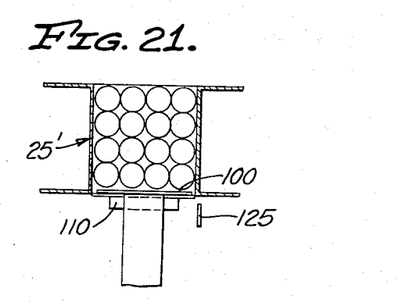

In FIGURES 20 and 21, the cam shaft has advanced to 306 degrees. The platen 100 is now down at the bottom of the carton; the folding bars 110 have folded the flaps 124 against the underside of the platen 100; and the holding flange is still hanging downwardly.

Figure 22:
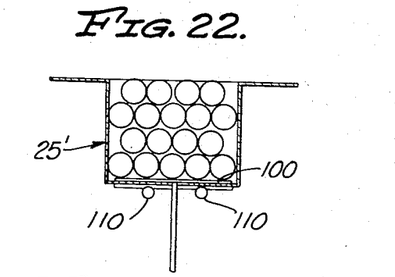
FIGURES 22 and 23 show the condition obtained when the control cam is at the 348 degree position, at which point the holding flange has been swung up to engage the underside of the folded end flaps of the carton to hold them in place.
Figure 23:
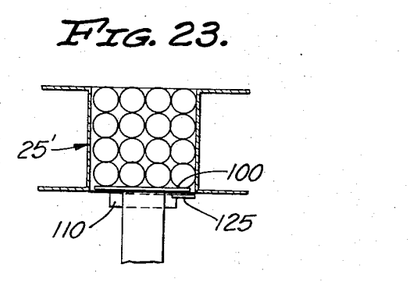

In FIGURES 22 and 23, the cam shaft has advanced to the 348 degree positon. The folding bars 110 are still holding the flaps 124 against the underside of the platen 100, but the holding flange 125 has been swung up to its horizontal position and now engages the flaps 124.

Figure 24:
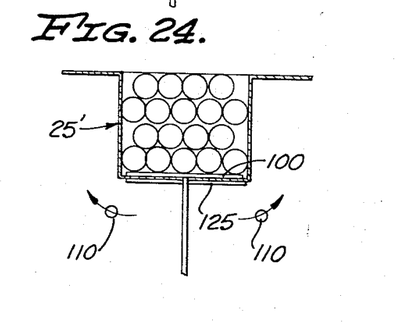
FIGURES 24 and 25 show the condition obtained when the control cam is at the 354 degree position, at which point the folding bars are being returned to their original position behind the flaps of the next succeeding empty carton.
Figure 25:
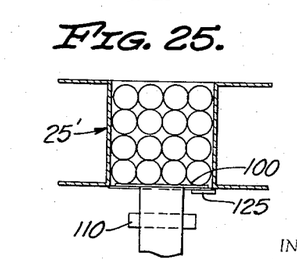

In FIGURES 24 and 25, the cam shaft 136 has advanced to the 354 degree position, and the folding bars are being retracted. The fully loaded carton is now about to be pushed from the loading station, and the holding flange 125 provides a smooth ramp for the bottom flaps 124 as the latter move onto the platform 130.

The exact number of degrees of rotation of the cam shaft 136, as described above, is not critical, and the figures given are merely by way of example.

The invention also contemplates the use of a stiff cardboard panel in place of the platen 100, which would be supported on 3 or 4 posts projecting upwardly into the carton through ventilation holes provided in the bottom flaps thereof; the said bottom flaps being closed in this case prior to the loading operation, and the cardboard panel being left in the bottom of the carton after the latter has been filled. The posts supporting the said cardboard panel would lower the panel one layer at a time, the same as platen 100, and when the carton has been filled, the said posts would be retracted clear of the carton to allow the latter to be removed from the loading station.

While I have shown and described a preferred embodiment of my invention in considerable detail herein, it will be understood by those skilled in the art that various changes may be made in the several parts and the shape and arrangement thereof, without departing from the broad scope of the invention as defined in the following claims.

I claim:
1. A machine for packing fruit into a carton which is open at the top and bottom ends thereof, and which is positioned at a loading station, said machine comprising:
   a grid movable between a first position directly over said carton, and a second position removed to one side thereof;
   said grid having a plurality of pockets to receive said fruit, said pockets being arranged in at least one group representing one layer of said carton, the pockets of said group being arranged in a lose pattern corresponding to the pattern in which said fruit is to be packed in said one layer;
   means for loading said fruit into said pockets;
   means for simultaneously ejecting said fruit from all of the pockets of said group and transferring the fruit into said carton;
   means for compacting said fruit from said loose pattern of said grid to a tightly packed pattern of dimensions to be received within said carton;
   a platen projecting up through said carton from the open bottom end thereof and providing a receiving surface for said fruit at the plane of the top edge of the carton, said platen being movable downwardly with respect to said carton in synchronism with said fruit as the latter completes its travel in the process of being transferred from said grid to said carton; and
   means for removing the loaded carton from said loading station and replacing the same with an empty carton.

2. A machine for packing fruit into a carton which is open at the top and bottom ends thereof, and which is positioned at a loading station, said machine comprising:
   a grid movable between a first position directly over said carton, and a second position removed to one side thereof;
   said grid having a plurality of pockets to receive said fruit, said pockets being arranged in at least one group representing one layer of said carton, the pockets of said group being arranged in a loose pattern corresponding to the pattern in which said fruit is to be packed in said one layer;
   means for loading fruit into said pocket at said grid moves from said first position to said second position;
   means for simultaneously ejecting said fruit from all of the pockets of said group and transferring the fruit into said carton, when said grid is at said first position;
   means for compacting said fruit from said loose pattern of said grid to a tightly packed pattern of dimensions to be received within said carton;
   a platen projecting up into said carton from the open bottom end thereof and providing a receiving surface for said fruit at the plane of the top edge of the carton, said platen being movable downwardly with respect to said carton in synchronism with said fruit as the latter completes its travel in the process of being transferred from said grid to said carton;
   means for folding the two opposed bottom flaps of said carton against the underside of said platen when said carton has been completely filled; and means for sliding said loaded carton off said platen to one side of said loading station.

3. A machine for packing fruit into a carton in a plurality of layers, each layer having the fruit arranged in a predetermined pattern, said carton having flaps at the top and bottom ends thereof which are open, and said carton being positioned at a loading station, said machine comprising:
 a grid positioned above said carton and movable horizontally with respect thereto between a starting position and a terminal position;
 said grid having a plurality of pockets provided therein, which are arranged in at least one group representing one layer of said carton, the pockets of said one group being arranged in a loose pattern corresponding to said predetermined pattern for said one layer;
 means for loading fruit into said pockets;
 means for advancing said grid from said starting position toward said terminal position, to position said one group of pockets directly above said carton;
 means for simultaneously ejecting said fruit from all of said pockets in said one group, and transferring the same into said carton;
 means for compacting said fruit from said loose pattern of said grid into a tightly packed pattern of dimensions to be received within the open top of said carton;
 a platen projecting up into said carton from the open bottom end thereof, and providing a receiving surface for said fruit at the plane of the top edge of the carton, said platen being movable downwardly in synchronism with said fruit as the latter completes its travel in the process of being transferred from said grid to said carton;
 said grid being successively advanced over said carton so as to position groups of pockets containing fruit directly over said carton, where said fruit is expelled from said pockets and transferred as complete layers into said carton, until the carton has been filled; and
 means for removing the loaded carton from said loading station and replacing the same with an empty carton.

4. A machine as described in claim 3, having means for folding two opposed bottom flaps of said carton against the underside of said platen when said carton has been completely filled; and
 means for sliding said loaded carton off said platen to one side of said loading station.

5. A machine as described in claim 3, wherein said grid has a plurality of groups of pockets provided therein, each of said groups of pockets being arranged in the pattern of one of the layers in said carton;
 means for advancing said grid from said starting position to said terminal position in a series of steps, wheereby said groups of pockets are successively positioned directly above said carton; and
 means for simultaneously ejecting the fruit from all of the pockets in each of said groups as said groups are positioned above said carton, said fruit being transferred into said carton as one complete layer at a time.

6. A machine as described in claim 5, wherein said pockets are filled with fruit by said loading means as said grid is returned from said terminal position to said starting position, after filling said carton.

7. A machine for packing fruit into a carton in a plurality of layers, each layer having the fruit arranged in a predetermined pattern, said carton having flaps at the top and bottom ends thereof which are open, and said carton being positioned at a loading station, said machine comprising:
 a grid positioned above said carton and movable horizontally with respect thereto between a starting position and a terminal position;
 said grid having a plurality of pockets provided therein, which are arranged in at least one group representing one layer of said carton, the pockets of said one group being arranged in a loose pattern corresponding to said predetermined pattern for said one layer;
 a plurality of laterally spaced loading tubes positioned above said grid, said loading tubes being spaced apart the same distance as the lateral spacing between said pockets, and said loading tubes being aligned with said pockets;
 means on said loading tubes for releasing fruit one at a time into said pockets as each pocket passes beneath the end of its corresponding loading tube during travel of said grid from said terminal position to said starting position;
 means for ejecting simultaneously said fruit from all of said pockets in said one group, and transferring the same into said carton;
 means for compacting said fruit from said loose pattern of said grid into a tightly packed pattern of dimensions to be received within the open top end of said carton;
 a platen projecting up into said carton from the open bottom end thereof, and providing a receiving surface for said fruit at the plane of the top edge of the carton, said platen being movable downwardly in synchronism with said fruit as the latter completes its travel in the process of being transferred from said grid to said carton;
 said grid being successively advanced over said carton so as to position groups of pockets containing fruit directly over said carton, where said fruit is expelled from said pockets and transferred as complete layers into said carton, until the carton has been filled; and
 means for removing the loaded carton from said loading station and replacing the same with an empty carton.

8. A machine for packing fruit into a carton in a plurality of layers, each layer having the fruit arranged in a predetermined pattern, said carton having flaps at the top and bottom ends thereof which are open, and said carton being positioned at a loading station, said machine comprising:
 a grid positioned above said carton and movable horizontally with respect thereto between a starting position and a terminal position;
 said grid having a plurality of pockets provided therein, which are arranged in at least one group representing one layer of said carton, the pockets of said one group being arranged in a loose pattern corresponding to said predetermined pattern for one layer;
 means for loading fruit into said pockets;
 a plurality of strippers positioned above said grid directly over said carton, said strippers corresponding in number and position to the pockets in said one group;
 each of said strippers consisting of a vertically movable plunger having a lower end engageable with the fruit in the corresponding pocket, said plunger functioning to drive said fruit out of said pocket and down into said carton;
 means for driving said plungers downwardly in unison;
 means for guiding said fruit along downwardly converging paths as the fruit is ejected from said pockets, whereby said fruit is compacted from the loose pattern of said grid into a tightly packed pattern of dimensions to be received within the open top end of said carton;
 a platen projecting up into said carton from the open bottom end thereof, and providing a receiving surface for said fruit at the plane of the top edge of the carton, said platen being movable downwardly in synchronism with said fruit as the latter completes its travel in the process of being transferred from said grid to the top layer level of said carton;

said grid being successively advanced over said carton so as to position groups of pockets containing fruit directly over said carton, where said fruit is expelled from said pockets and transferred as complete layers into said carton, until the carton has been filled; and means for removing the loaded carton from said loading station and replacing the same with an empty carton.

9. A machine for packing fruit into a carton in a plurality of layers, each layer having the fruit arranged in a predetermined pattern, said carton having flaps at the top and bottom ends thereof which are open, and said carton being positioned at a loading station, said machine comprising:

a grid positioned above said carton and movable horizontally with respect thereto between a starting position and a terminal position;

said grid having a plurality of pockets provided therein, which are arranged in a plurality of groups, each of said groups being arranged in the pattern of one of the layers in said carton;

means for loading fruit into said pockets;

means for advancing said grid from said starting position to said terminal position in a series of steps, whereby said groups of pockets are successively positioned directly above said carton;

means for simultaneously ejecting the fruit from all of the pockets in each of said groups as said groups are successively positioned above said carton, said fruit being transferred into said carton as one complete layer at a time;

means for guiding said fruit along downwardly converging paths as it is ejected from said pockets, whereby said fruit is compacted from the loose pattern of said grid into a tightly packed pattern of dimensions to be received within an open top end of said carton;

a platen projecting up into said carton from the open bottom end thereof, and providing a receiving surface for said fruit at the plane of the top edge of the carton, said plates being movable downwardly in synchronism with said fruit as the latter is inserted down into the top layer position within the carton; and means for removing the loaded carton from said loading station and replacing the same with an empty carton.

10. A fruit packing machine as described in claim 9, wherein said means for loading said fruit into said pockets comprises a plurality of laterally spaced loading tubes positioned above said grid, said loading tubes being spaced apart the same distance as the lateral spacing between said pockets, and said loading tubes being aligned with said pockets; and means on said loading tubes for releasing fruit one at a time into said pockets as each pocket passes beneath the end of the corresponding loading tube during travel of said grid from said terminal position to said starting position.

11. A fruit packing machine as described in claim 10, wherein said grid has a longitudinally extending cam mounted thereon;

cam follower means riding on said cam and operable to actuate said fruit releasing means on said loading tubes when said grid is moving in the direction from said terminal position to said starting position; and said cam follower means being inoperable when said grid is moving in the opposite direction.

12. A fruit packing machine as described in claim 10, having means for folding the two opposed bottom flaps of said carton against the underside of said platen when said carton has been completely filled;

a holding flange pivoted on said machine below said carton along the leading edge thereof, and swingable between a horizontal position supporting the bottom edge of said carton, and a depending position;

means for positioning said holding flange at said horizontal position during loading of the carton, then swinging the holding flange down to said depending position while said bottom flaps are being folded against the underside of said platen, and finally swinging the holding flange back up to said horizontal position, underlying said folded flaps; and means for sliding said loaded carton off said platen to a point beyond said loading station.

13. A machine for packing fruit into a carton in a plurality of layers, each layer having the fruit arranged in a predetermined pattern, said carton having flaps at the top and bottom ends thereof which are open, and said carton being positioned at a loading station, said machine comprising:

a grid positioned above said carton and movable horizontally with respect thereto between a starting position and a terminal position;

said grid having a plurality of pockets provided therein, which are arranged in a plurality of groups, each of said groups of pockets being arranged in the pattern of one of the layers of said carton;

a plurality of laterally spaced loading tubes positioned above said grid, said loading tubes being spaced apart the same distance as the lateral spacing between said pockets, and said loading tubes being aligned with said pockets;

means on said loading tubes for releasing fruit one at a time into said pockets as each pocket passes beneath the end of its corresponding loading tube during travel of said grid from said terminal position to said starting position;

means for advancing said grid from said starting position to said terminal position in a series of steps, whereby said groups of pockets are successively positioned directly above said carton;

means for simultaneously ejecting all the fruit from all of the pockets in each of said groups as said groups are successively positioned above said carton, said fruit being transferred into said carton as one complete layer at a time;

means for guiding said fruit along downwardly converging paths as it is ejected from said pockets, whereby said fruit is compacted from the loose pattern of said grid into a tightly packed pattern of dimensions to be received within the open top end of said carton;

supporting means projecting up into said carton from the open bottom end thereof and providing a receiving surface for said fruit at the plane of the top edge of the carton, said supporting means being movable downwardly in synchronism with said fruit as the latter is inserted down into the top layer position within the carton;

means for folding the two opposed bottom flaps on the sides of the carton parallel to the line of travel of said carton as the latter leaves said loading station, said flaps being folded inwardly to close the bottom end of said carton when the latter has been completely filled; and means for removing said loaded carton from said loading station and replacing the same with an empty carton.

14. A machine for packing fruit into a carton in a plurality of layers, each layer having the fruit arranged in a predetermined pattern, said carton having flaps at the top and bottom ends thereof which are open, and said carton being positioned at a loading station, said machine comprising:

a grid positioned above said carton and movable horizontally with respect thereto between a starting position and a terminal position;
said grid having a plurality of pockets provided therein which are arranged in a plurality of rows, each of said groups of pockets being arranged in the pattern of one of the layers of said carton;
means for loading fruit into said pockets as said grid is removed from said terminal position to said starting position;
said grid being advanced from said starting position to said terminal position in a series of steps, whereby said groups of pockets are successively positioned directly above said carton;
a stripper operable to eject the fruit from all of the pockets in each of said groups as said groups are successively positioned above said carton;
means for guiding said fruit along downwardly converging paths as it is ejected from said pockets, whereby said fruit is compacted from the loose pattern of said grid into a tightly packed pattern of dimensions to be received within the open top end of said carton;
supporting means projecting up into said carton from the open bottom end thereof and providing a receiving surface for said fruit at the plane of the top edge of the carton, said supporting means being movable downwardly in synchronism with said fruit as the latter is inserted;
folding means for folding two opposed bottom flaps inwardly to close the bottom end of said carton;
carton-advancing means for removing the loaded carton from said loading station and replacing the same with an empty carton;
a motor-driven cam assembly comprising a plurality of cams, each of which makes one complete revolution in one cycle of the machine;
a cam follower riding on each of the cams;
step-up gears connected to each of said cam followers, to be driven thereby; and
driving means connecting each of said cam followers and step-up gear assemblies to one of the operating components of said machine, there being a separate cam and associated mechanism for driving said grid, said stripper, said supporting means, said folding means, and said carton-advancing means, respectively.

15. A machine for packing fruit into a carton in a plurality of layers, each layer having the fruit arranged in a predetermined pattern, said carton having flaps at the top and bottom ends thereof which are open, and said carton being positioned at a loading station, said machine comprising:

a grid positioned above said carton and movable horizontally with respect thereto between a starting position and a terminal position;
said grid having a plurality of pockets provided therein, which are arranged in a plurality of groups, each of said groups of pockets being arranged in the pattern of one of the layers in said carton;
said pockets being arranged in rows extending transversely across said grid, and alternate rows of pockets being staggered laterally with respect to the intervening rows;
a plurality of laterally spaced feed tubes positioned above said grid, said feed tubes being spaced apart the same distance as the lateral spacing between pockets in one of said rows;
means for producing relative movement between said grid and said feed tubes, whereby said feed tubes are alternately aligned with the pockets in one row on said grid, and then with the pockets in the next row;
means for releasing fruit one at a time from each of said feed tubes into its corresponding pocket, each time one row of pockets passes beneath the lower ends of said feed tubes as said grid is returned from said terminal position to said starting position, said fruit-releasing means being inoperable when said grid is traveling in the other direction;
means for advancing said grid from said starting position to said terminal position in a series of steps, whereby said groups of pockets are successively positioned above said carton;
means for simultaneously ejecting the fruit from all of the pockets in each of said groups as said groups are successively positioned above said carton, said fruit being transferred into the top layer level of said carton as one complete layer at a time;
means for compacting said fruit from the relatively loose pattern of said grid into a tightly packed pattern of dimensions to be received within the open top end of said carton; and
means for lowering the fruit in said carton one layer at a time as each new layer is placed therein.

References Cited

UNITED STATES PATENTS

| | | | |
|---|---|---|---|
| 2,339,115 | 1/1944 | Scherer | 53—35 |
| 2,921,702 | 1/1960 | Gross | 53—245 X |
| 2,938,315 | 5/1960 | Voullaire | 53—35 |
| 3,001,344 | 9/1961 | Morton et al. | 53—35 X |
| 3,049,844 | 8/1962 | Leitzel | 53—345 X |

GRANVILLE Y. CUSTER, JR., *Primary Examiner.*